US006454440B2

(12) United States Patent
Yamamoto (10) Patent No.: US 6,454,440 B2
(45) Date of Patent: Sep. 24, 2002

(54) ILLUMINATION APPARATUS AND PROJECTION TYPE DISPLAY APPARATUS USING THE SAME (75) Inventor: Chikara Yamamoto, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/893,008

(22) Filed: Jun. 28, 2001

(30) Foreign Application Priority Data

Jul. 28, 2000 (JP) ........................ 2000-229661

(51) Int. Cl.[7] .................. F21V 13/14; F21V 14/04
(52) U.S. Cl. ............... 362/293; 362/268; 362/282; 362/293; 362/297; 362/323; 359/226; 359/884
(58) Field of Search ................. 359/225, 226, 359/884; 362/268, 277, 280–284, 293, 319, 322–324, 297

(56) References Cited

U.S. PATENT DOCUMENTS 4,535,394 A * 8/1985 Dugre ..................... 362/293
4,800,474 A * 1/1989 Bornhorst ................ 362/293
5,186,536 A * 2/1993 Bornhorst et al. ....... 362/293
5,849,468 A * 12/1998 Sawyer .................... 359/226

OTHER PUBLICATIONS

Japanese Patent Office, Japanese Patent Publication No. 2939237, Publication Date: Jun. 11, 1999, Application No.: 10-91886, Filing Date: Apr. 3, 1998, pp. 1–11 (English Language Abstract provided—Japanese Unexamined Patent Publication No.: 11002780 A, Date of Publication: Jun. 1, 1999, Application No.: 10-91886, Filing Date: Apr. 3, 1998.

* cited by examiner

Primary Examiner—Alan Cariaso
(74) Attorney, Agent, or Firm—Snider & Associates; Ronald R. Snider (57) ABSTRACT An illumination apparatus and a projection type image display apparatus are provided. The illumination apparatus comprises a light source section, a color reflector, and light quantity homogenizing means. The light source section is constituted by an illuminant and a light converging portion for converging a luminous flux from the illuminant. The color reflector comprises a rotary reflecting member disposed at a position where the luminous flux from the light source section is converged. The rotary reflecting member reflects only a specific wavelength component in the luminous flux according to an angle of rotation from a reference position. The light quantity homogenizing means homogenizes the light quantity of the luminous flux reflected by the color reflector.

14 Claims, 8 Drawing Sheets

DMD

PARTLY ENLARGED VIEW OF DMD

NORMAL OF
WHOLE DMD

FIG.8
PRIOR ART

ILLUMINATION APPARATUS AND PROJECTION TYPE DISPLAY APPARATUS USING THE SAME

RELATED APPLICATIONS

This application claims the priority of Japanese Patent Application No. 2000-229661 filed on Jul. 28, 2000, which is incorporated herein by reference.

BACKGROUND OF THE INVENTION

1. Field of the Invention

The present invention relates to an illumination apparatus and a projection type display apparatus using the same; and, in particular, to improvements in a projection type display apparatus which projects an image under magnification by using a transmission type or reflection type liquid crystal display device or a digital micromirror device (DMD) and in an illumination apparatus mounted in the projection type display apparatus.

2. Description of the Prior Art

As the projection type display apparatus, one using a transmission type or reflection type liquid crystal display device, for example, has been well known. Also, DMDs have been put into use in recent years.

On the other hand, there has been a strong demand for making the projection type display apparatus further compact. Therefore, in order to reduce the number of light valves such as liquid crystal display devices, one employing a color sequence technique has been known (e.g., Japanese Patent Publication No. 2939237).

Figure 8:
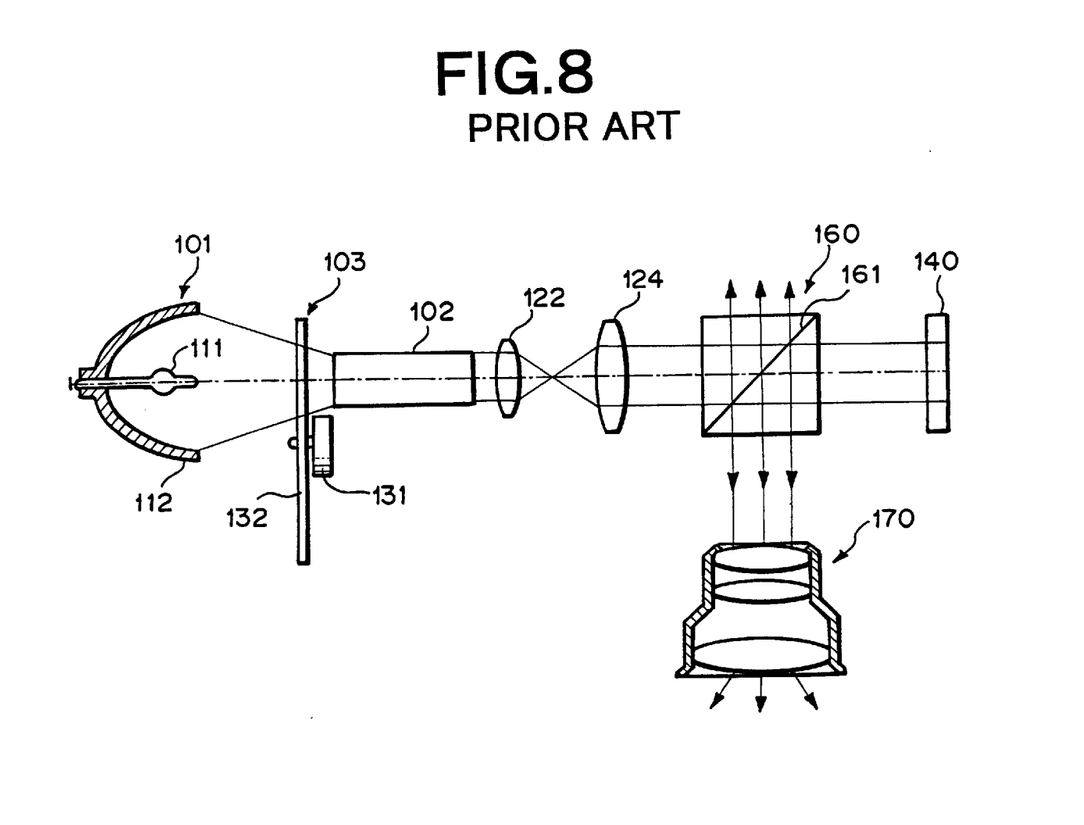
FIG. 8 is a schematic view for explaining a conventional projection type display apparatus.

FIG. 8 shows the configuration of a conventional projection type display apparatus having such a color sequence type technique introduced therein and using a reflection type liquid crystal display device.

The projection type display apparatus in accordance with this prior art comprises a light source section 101 composed of an illuminant 111 and a reflector 112; a color wheel section 103 in which a disk 132 for selectively transmitting therethrough a predetermined wavelength of light in a luminous flux emitted from the light source section 101 is rotatable by a rotary motor 131; a rod integrator 102 for mixing color light components selected by and transmitted through the color wheel section 103 in order to homogenize the light quantity distribution; a convergent lens 122; a collimator lens 124; a polarizing beam splitter 160 for deflecting the incident light at a polarizing surface 161; a reflection type liquid crystal display device 140 for selectively reflecting incident light so as to generate a color light component carrying image information; and a projection lens 170 for projecting the color light component carrying the image information onto a screen which is not depicted.

Also known is one using a flyeye integrator in place of the above-mentioned rod integrator 102 (e.g., Japanese Patent Publication No. 2939237). In this prior art, the illumination efficiency can be prevented from deteriorating due to the use of a rod integrator, uneven illumination can be kept from occurring due to dust attached to a rod end face or unevenness in coating thereof, and so forth.

Since the light source section, the integrator, and the liquid crystal display device (light valve) are disposed substantially linearly in any of the above-mentioned prior art, they are hard to accommodate within the apparatus housing compactly. Though the optical system can be constructed three-dimensionally if a mirror member is used for bending the optical path, separately providing the mirror member necessitates a space for placing the same and raises the cost. In particular, it is difficult for a mirror member to be disposed separately in a region extending from the light source section to the integrator, so that there is substantially no freedom in design for arranging the optical system, which has been a large obstacle to make the apparatus compact.

In the case where a mirror member is separately provided as mentioned above so as to three-dimensionally bend the optical path between the integrator section and the liquid crystal display device (light valve), the illumination area rotates on the liquid crystal display device (light valve), which is problematic.

Since the current projection type display apparatus is aimed at delicately arranging individual members of the optical axis so as to utilize the space within the apparatus as efficiently as possible, there has been an urgent necessity to clear the obstacles mentioned above.

SUMMARY OF THE INVENTION

In view of such circumstances, it is an object of the present invention to provide an illumination apparatus employing a color sequence technique, improving the freedom of design from the light source section to the integrator, and achieving a three-dimensional construction of the optical system without separately providing a reflection member, whereby the apparatus can be made compact at a lower cost without generating problems such as the rotation of the illumination area; and a projection type display apparatus using the same.

The present invention provides an illumination apparatus comprising:

a light source section constituted by an illuminant and a light converging portion for converging a luminous flux from the illuminant;

a color reflector comprising a rotary reflecting member disposed at a position where the luminous flux from the light source section is converged, the rotary reflecting member reflecting only a specific wavelength component in the luminous flux according to an angle of rotation from a reference position; and light quantity homogenizing means for homogenizing a light quantity of the luminous flux reflected by the color reflector.

Preferably, the color reflector comprises n areas separately formed in a circumferential direction, each area being formed with a reflecting surface for reflecting only a predetermined specific wavelength component in the luminous flux, whereas the luminous flux from the light source section successively irradiates the reflecting surfaces.

The reflecting surfaces are formed in the respective areas on the color reflector such that center angle regions of the reflecting surfaces reflecting only the predetermined specific wavelength component have substantially the same size.

The n may be 3, whereas the reflecting surfaces may comprise a red light reflecting surface, a green light reflecting surface, and a blue light reflecting surface.

On the color reflector, the green light reflecting surface may be formed with a center angle region greater than that of each of the other reflecting surfaces.

Preferably, the light quantity homogenizing means is constituted by a pair of flyeye lens members.

An axis of rotation of the color reflector and a normal on each reflecting surface may be either substantially parallel to each other or substantially perpendicular to each other.

The color reflector may have a polygonal cross section perpendicular to an axis of rotation, whereas the reflecting surfaces are successively formed at a side face portion.

The polygonal cross section may be a regular polygon.

The reflecting surface may be formed from a dichroic film. Also, the reflecting surface may be formed from a diffraction grating or hologram.

The present invention provides a projection type display apparatus comprising:

the illumination apparatus mentioned above;

a light valve for modulating output light from the light quantity homogenizing means according to a predetermined image signal; and a projection lens for projecting an optical image formed by the light modulated by the light valve onto a screen.

When a single light valve is used, the apparatus can be made more compact.

DESCRIPTION OF THE PREFERRED EMBODIMENTS

In the following, embodiments of the present invention will be explained with reference to specific examples.

Figure 1:
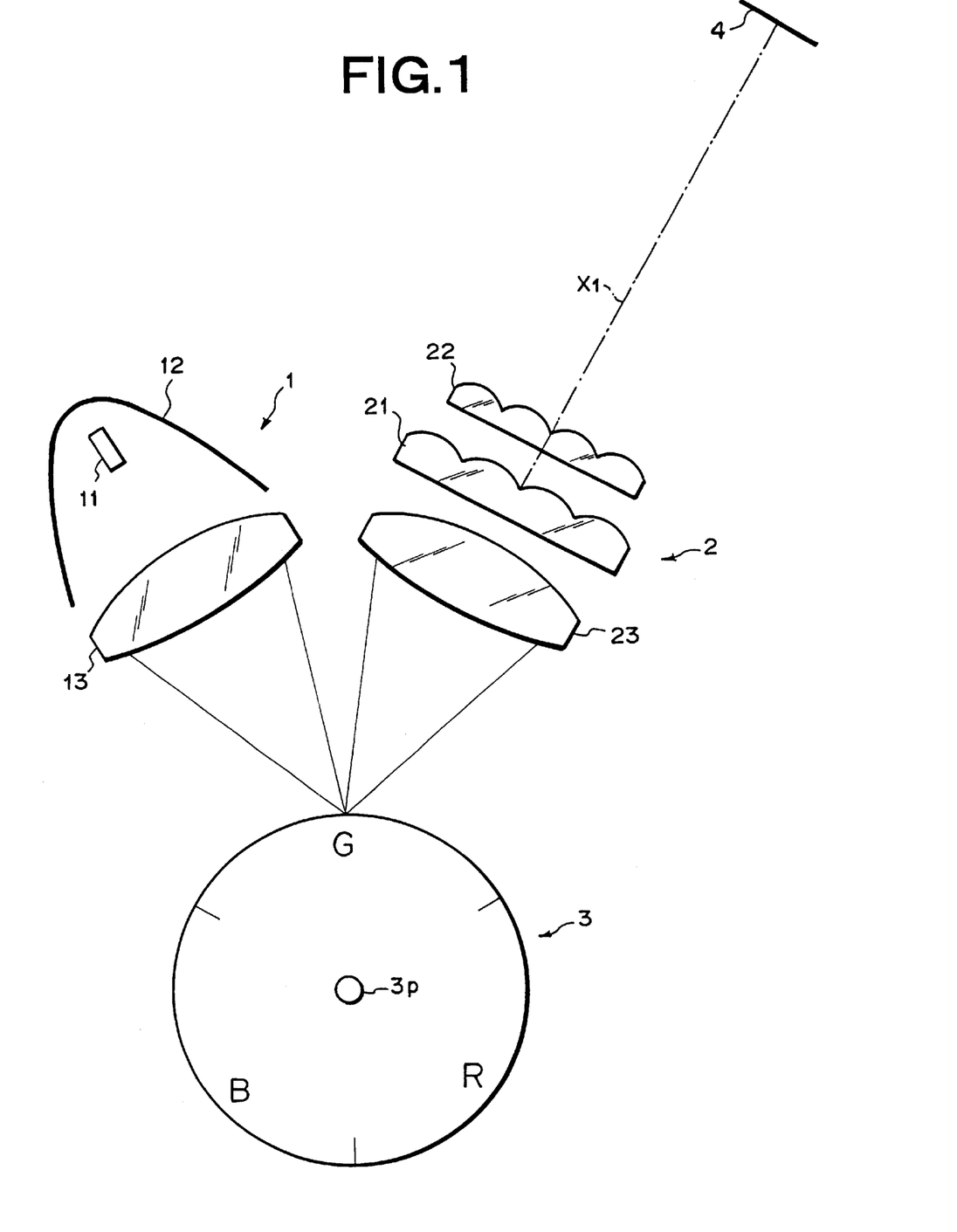
FIG. 1 is a schematic view showing the illumination apparatus in accordance with a first embodiment of the present invention.

FIG. 1 shows the illumination apparatus in accordance with a first embodiment of the present invention.

This illumination apparatus comprises a light source section 1; a color reflector 3 shaped like a thick disk whose side face is provided with R, G, and B dichroic films for successively reflecting R, G, and B light components, as being rotated, in a luminous flux emitted by the light source section 1 and then converged; and an integrator section 2 for slightly converging the luminous flux reflected by the color reflector 3 and then homogenizing the light quantity distribution. The light emitted from the integrator section 2 is irradiated onto a liquid crystal display plate 4.

As shown in FIG. 1, the light source section 1 comprises an illuminant 11, made of a discharge tube such as a xenon lamp or a metal halide lamp, for emitting light in randomly polarized directions, and a reflector 12 made of a parabolic mirror. The reflector 12 has a focal position located at the light-emitting source of the illuminant 11, by which a part of the luminous flux emitted from the illuminant 11 and directed to the rear side and outside of the optical axis of the light source section 1 is reflected as a luminous flux substantially parallel to the optical axis.

The integrator section 2 comprises a second flyeye 21 acting on the luminous flux from the light source section 1, and a first flyeye 22 by which light spots caused by individual elements of the second flyeye 21 are superposed onto a liquid crystal panel which will be explained later.

The second flyeye 21 is constituted by a plurality of lens array elements which are arranged two-dimensionally, whereas each lens array element has a form substantially corresponding to the liquid crystal panel that will be explained later. Similarly, the first flyeye 22 is constituted by a plurality of lens array elements which are arranged two-dimensionally. An image of the light source section 1 is formed on the liquid crystal display section 4 at each lens array element of the first flyeye 22.

A convergent lens 13 is disposed behind the reflector 12, whereas a lens 23 is disposed in front of the second flyeye 21.

The optical axis $X_1$ of the integrator section 2 is configured so as to pass through the center of the liquid crystal display plate 4.

The color reflector 3 will now be explained.

The color reflector 3 is shaped like a thick disk rotatable about the center axis 3p of the color reflector 3 acting as the axis of rotation, whereas its side face is successively formed with respective dichroic films for reflecting R, G, and B light components at intervals of a center angle of 120°. The position where the luminous flux from the light source section 1 is converged at a substantially single point is set so as to coincide with the side face of the color reflector 3. Consequently, as the color reflector 3 rotates, R, G, and B light components are successively irradiated onto the liquid crystal display plate 4 by way of the integrator section 2.

The color reflector 3 has such a thickness that a luminous flux from the light source section irradiates the side face thereof even when the converging position slightly fluctuates.

Figure 2:
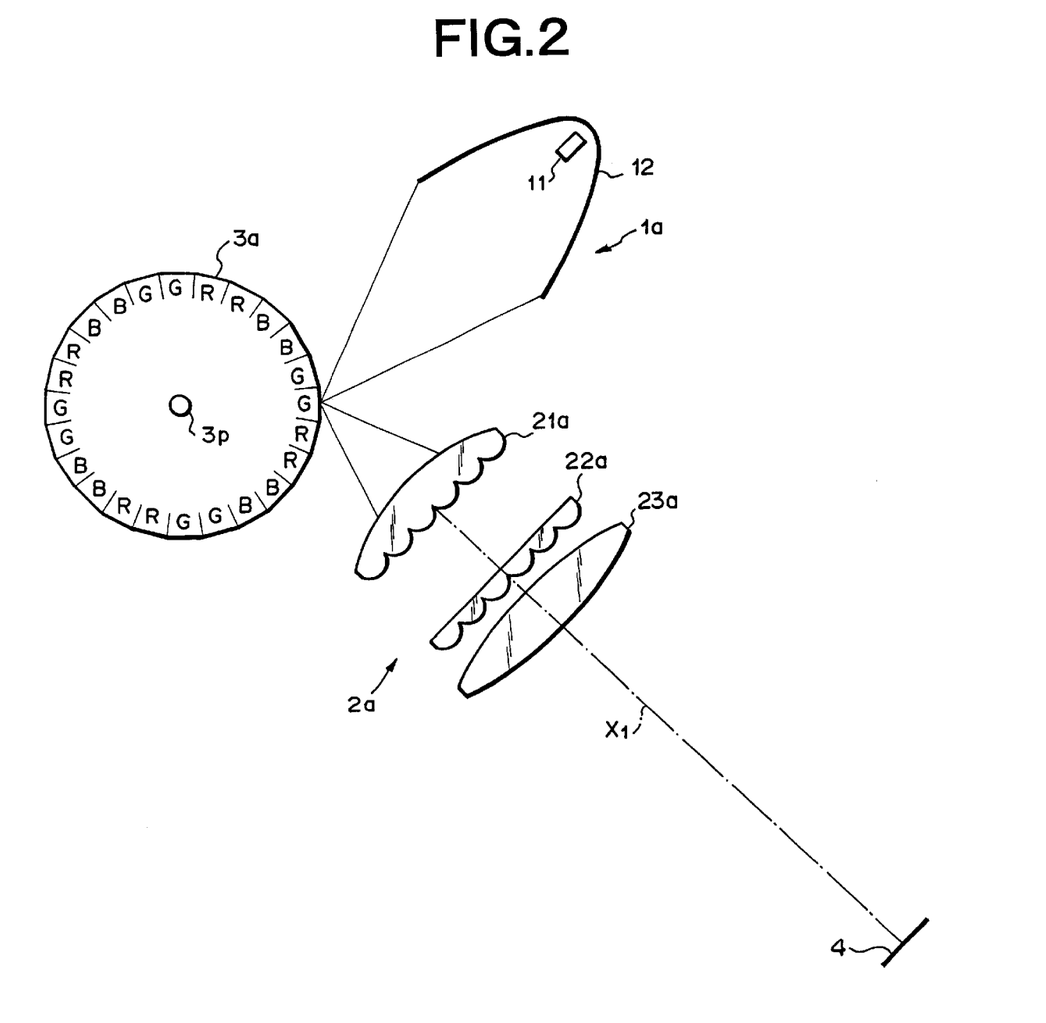
FIG. 2 is a schematic view showing the illumination apparatus in accordance with a second embodiment of the present invention.

FIG. 2 shows the illumination apparatus in accordance with a second embodiment of the present invention.

In this embodiment, the color reflector 3a is not shaped like a disk but has a polygonal cross section.

The case where the color reflector 3a has a polygonal cross section is preferable in that the accuracy in thickness can be made favorable when dichroic films are formed by vapor deposition and the like, since each side face is formed by a plane. When each side face is formed by a plane, however, the light reflected by the side face toward the integrator section 2a from the light source section 1a is scanned.

Therefore, this embodiment is configured such that the illumination area is always located at a predetermined region in the liquid crystal display plate 4 due to the second flyeye 21a, first flyeye 22a, and convergent lens 23a.

Figures 3A, 3B:
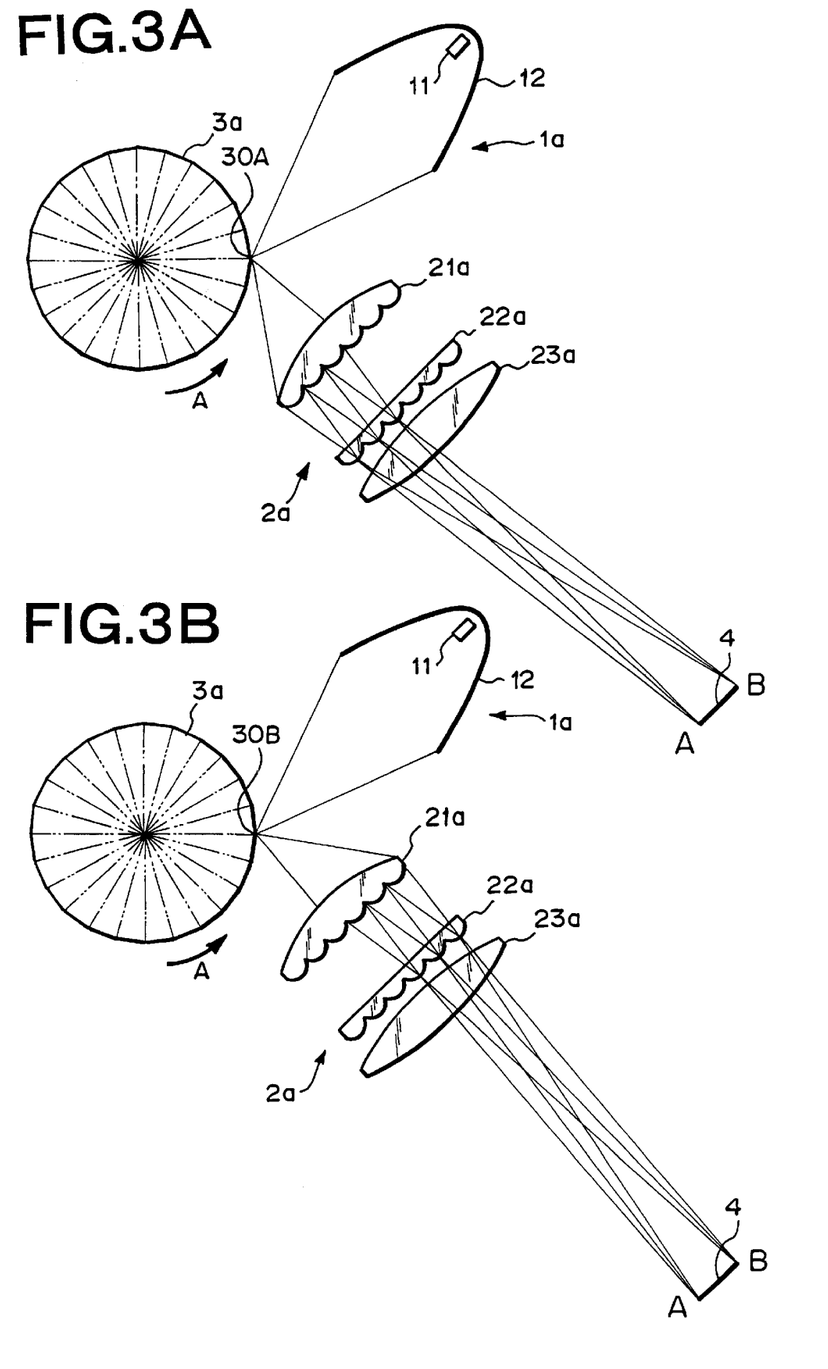
FIGS. 3A and 3B are schematic views showing operations of the illumination apparatus shown in FIG. 2.

FIGS. 3A and 3B shows the circumstances explained above.

Namely, when the color reflector 3a is rotating at a constant speed in the direction of arrow A, the angle of incidence of a light beam onto a predetermined surface is maximized in the state (shown in FIG. 3A) where a luminous flux from the light source section 1a is incident at an initial point 30A in this surface, whereby the reflected luminous flux is made incident on the integrator section 2a in the lower part of the drawing. Then, the integrator section 2a refracts the luminous flux upward in the drawing, so as to irradiate a predetermined area (A–B) of the liquid crystal display plate 4.

In the state (shown in FIG. 3B) where the luminous flux from the light source section 1a is incident at the last point 30B of one surface, the angle of incidence of the light beam onto this surface is minimized, whereby the reflected luminous flux is incident on the upper side of the drawing. Then, the integrator section 2a refracts the luminous flux downward in the drawing, so as to irradiate the predetermined area (A-B) of the liquid crystal display plate 4.

In the second embodiment, the color reflector 3a is shaped like a regular polygon. Though it can be shaped like an irregular polygon, the color reflector 3a can be rotated more stably if it is shaped like a regular polygon.

A third embodiment of the present invention will now be explained with reference to FIG. 4. This embodiment greatly differs from the above-mentioned first and second embodiments in that the axis of rotation of a color reflector 3b and the normal of the reflecting surface of each color light component are parallel to each other.

Namely, the R, G, and B dichroic reflecting surfaces are formed on the disk surface of the color reflector 3b at intervals of a center angle of 120°.

Since it will be sufficient if dichroic film is formed on a flat disk surface, it is advantageous in that the making of the color reflector 3b (the making of the disk and film) is easier than in the first and second embodiments.

Figure 4:
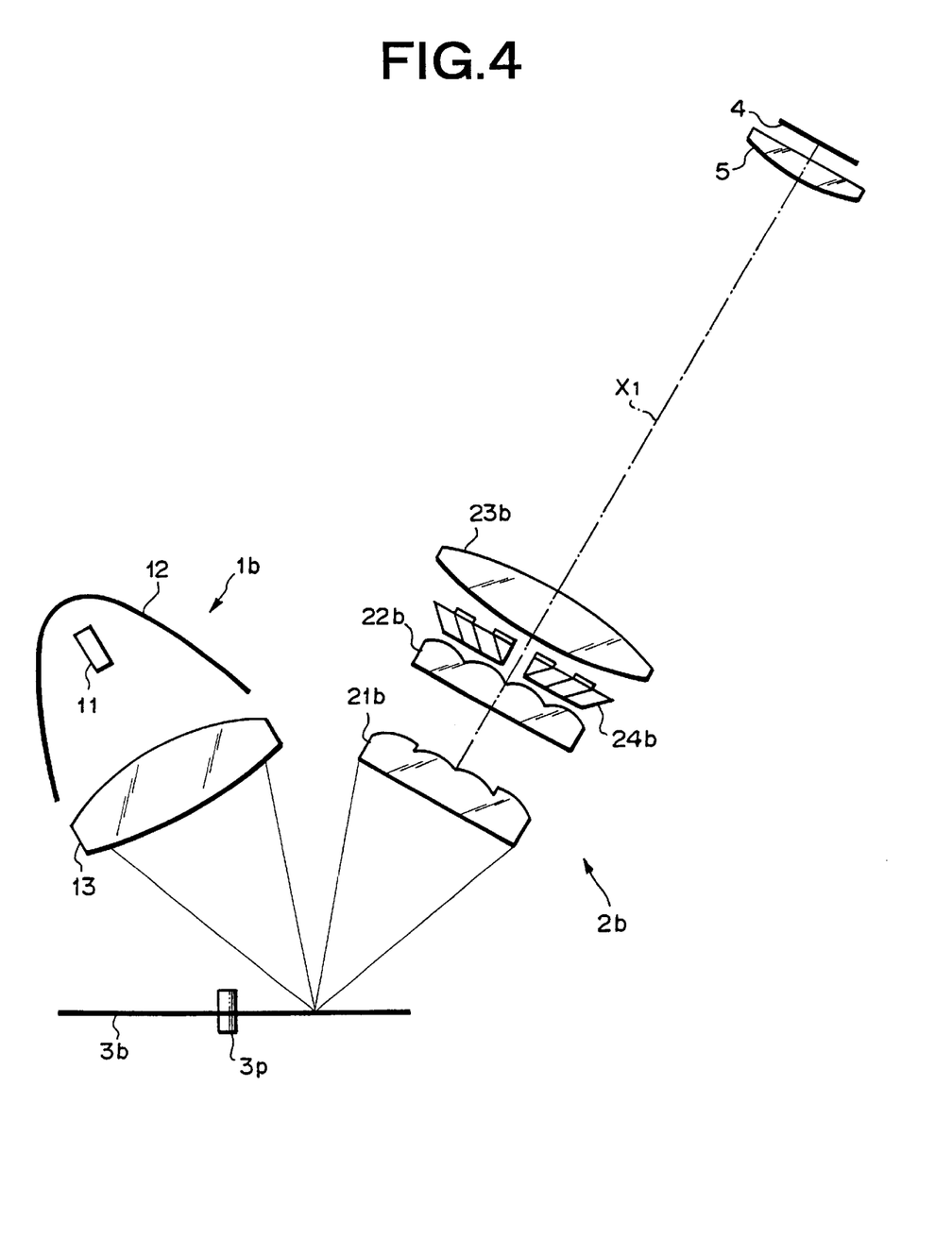
FIG. 4 is a schematic view showing the illumination apparatus in accordance with a third embodiment of the present invention.

In FIG. 4, a comb-shaped polarizing beam splitter 24b is disposed immediately downstream a first flyeye 22b, so that the light quantity can be made efficient in a compact configuration. Such a comb-shaped polarizing beam splitter 24b can also be used in the above-mentioned first and second embodiments as a matter of course.

In FIG. 4, a field lens 5 is disposed in front of the liquid crystal display plate 4.

Figure 5A:
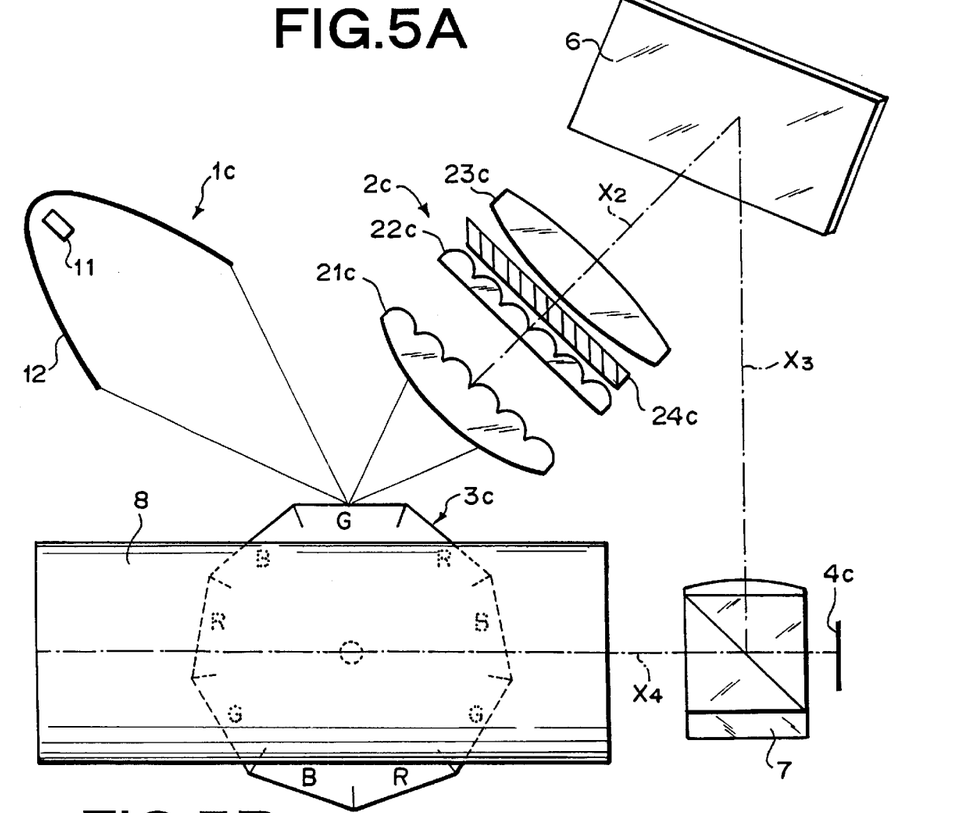
FIGS. 5A and 5B are schematic views showing the projection type display apparatus in accordance with an embodiment of the present invention.
Figure 5B:
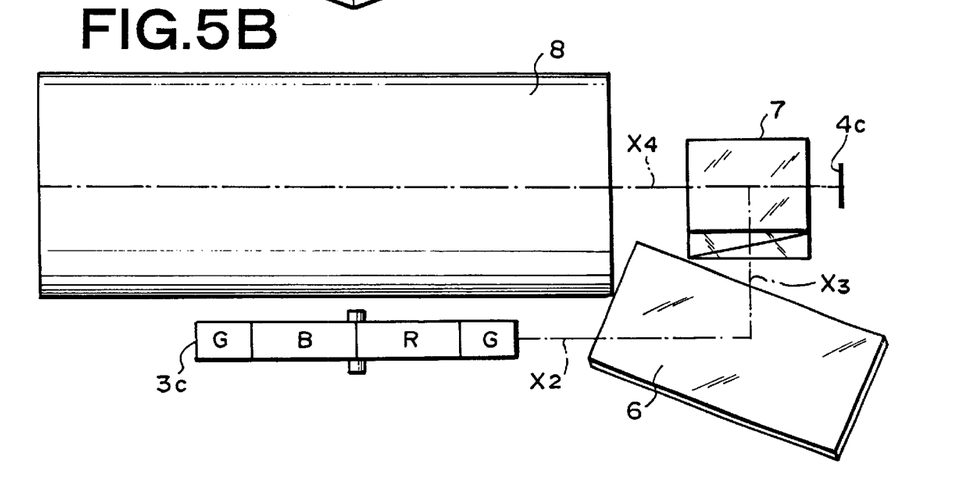

FIGS. 5A, 5B are schematic views showing the projection type display apparatus in accordance with an embodiment of the present invention. In particular, FIG. 5A is a view seen in a direction by which the upper face of the color reflector 3c can be observed, whereas FIG. 5B is a view seen in a direction by which the side face of the color reflector 3c can be observed.

Namely, this apparatus employs an illumination apparatus substantially the same as that shown in FIG. 2, in which a light source section (11, 12) 1c, a color reflector 3c, and an integrator section (21c, 22c, 23c) 2c have configurations substantially the same as the light source section 1a, color reflector 3a, and integrator section 2a in the embodiment of FIG. 2. In this embodiment, however, a comb-shaped polarizing beam splitter 24c is disposed between the first flyeye 22c and convergent lens 23c.

The color light component (polarized G light component in the state of FIGS. 5A and 5B) reflected by the integrator section 2a is reflected by a total reflection mirror 6, and then by a polarizing beam splitter 7. Thereafter, thus reflected light is reflected by a reflection type liquid crystal display plate 4c and caused to carry image information, and is transmitted through the polarizing beam splitter 7, so as to project a desirable image under magnification onto a screen by way of a projection lens 8.

If the luminous flux is reflected by the side face of the color reflector 3c as such, then the light source section 1c, the color reflector 3c, and the integrator section 2c are positioned on substantially the same plane, so that a space is formed on the upper side (or lower side) of the color reflector 3c, whereby the luminous flux can be bent upward while the projection lens 8 is disposed in the space as in this embodiment. Hence, the apparatus as a whole can be made compact.

Figure 6A:
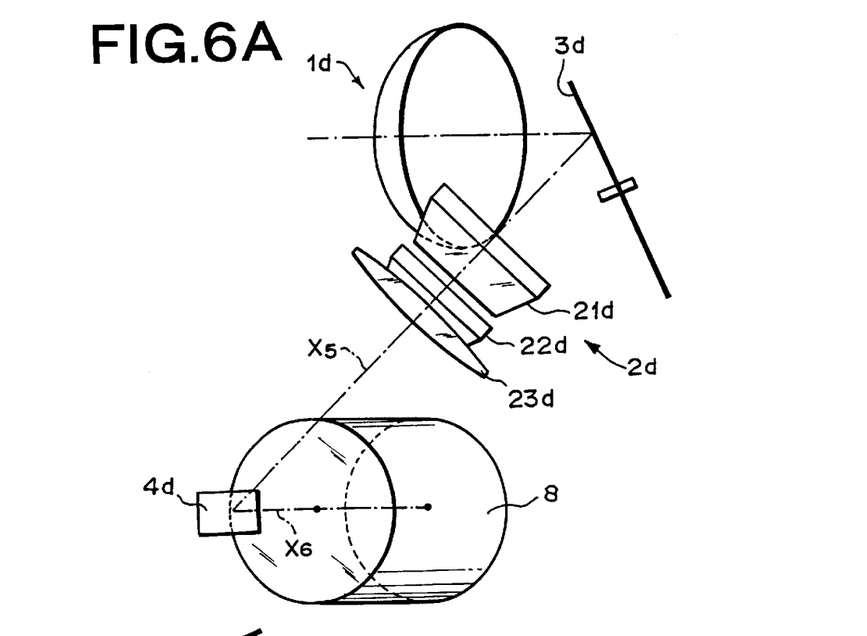
FIGS. 6A and 6B are schematic views showing the projection type display apparatus in accordance with another embodiment of the present invention.
Figure 6B:
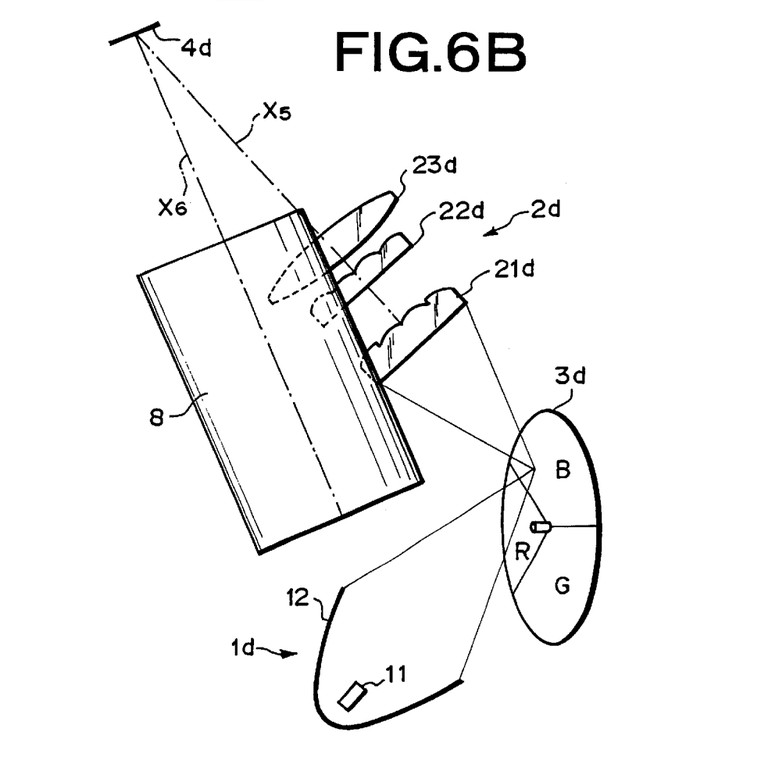

FIGS. 6A and 6B are schematic views showing the projection type display apparatus in accordance with another embodiment of the present invention. In particular, FIGS. 6A and 6B are views rotated by 90° from each other with reference to a predetermined position in a space.

The configuration of this embodiment is substantially the same as those mentioned above except that a DMD (digital micromirror device) 4d is used as the light valve.

Namely, the relative positional relationship and configurations of a light source section (11, 12) 1d, a color reflector 3d, and an integrator section (21d, 22d, 23d) 2d are substantially the same as those in the embodiment shown in FIG. 4. The positional relationships of these members to the DMD 4d and projection lens 8 are substantially the same as those in the embodiment shown in FIGS. 5A and 5B.

In the above-mentioned illumination apparatus, however, the light source is often fixedly arranged horizontal or vertical, whereas luminous fluxes are required to be obliquely incident on the DMD 4d. Therefore, when a luminous flux outputted from the light source is to be made incident on the DMD 4d, it is often required that the luminous flux be bent once so as to be obliquely incident on the DMD 4d. In such a case, if the luminous flux is reflected by the color reflector 3d in front of the integrator section 2d as in this embodiment, problems such as the rotation of the illumination area and the rise in cost caused by separately provided mirror members can be kept from occurring. Since the angle of incidence and angle of emission of light beams can be determined highly accurately in the DMD 4d, the angle of emission of the emitted light beam can be adjusted freely by the color reflector 3d as in this embodiment.

Figure 7A:
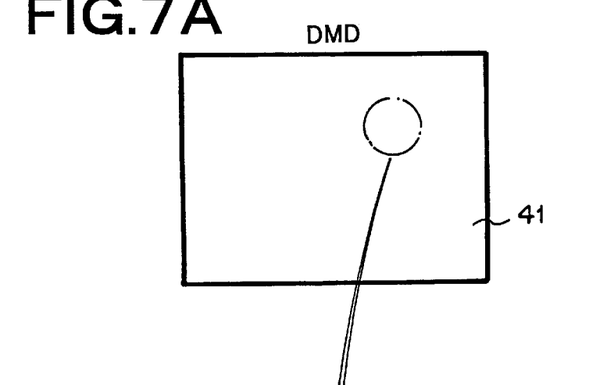
FIGS. 7A to 7C are views for explaining a DMD shown in FIGS. 6A and 6B.
Figure 7B:
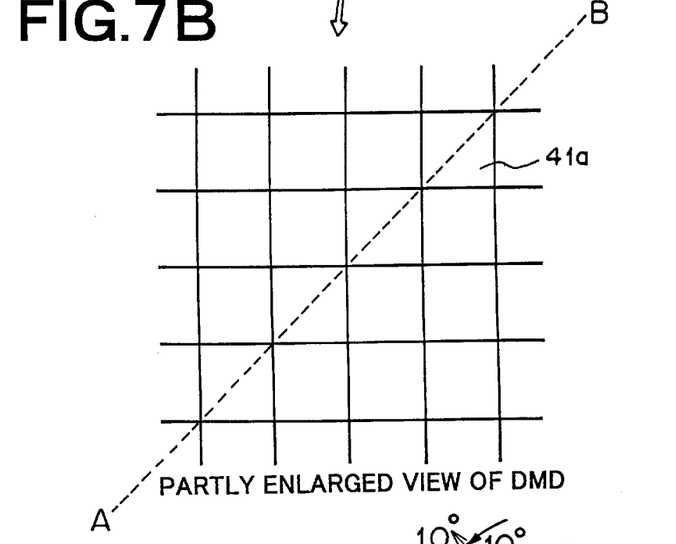
Figure 7C:
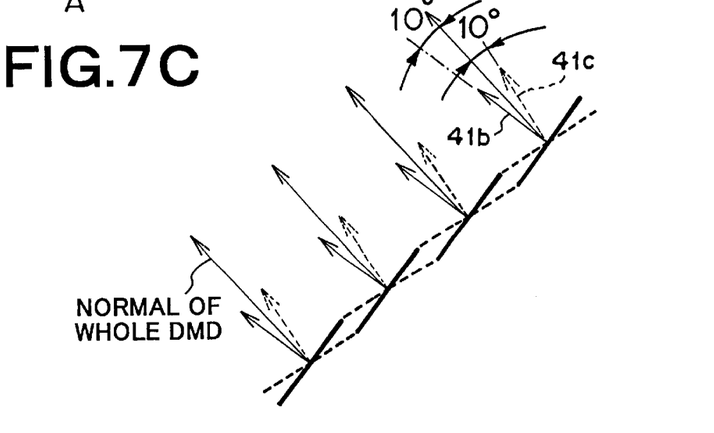

As shown in FIGS. 7A to 7C, a DMD 41 tilts each of a number of minute mirrors 41a (see FIG. 7B) formed like a matrix by a minute angle according to image signals. As shown in FIG. 7C, which is a schematic sectional view taken along the line A-B of FIG. 7B, the normal of each minute mirror 41a is caused to tilt by 10° with respect to the normal of the whole DMD 41 in opposite directions in the ON and OFF states (as indicated by arrows 41b and 41c, respectively).

The above-mentioned angle upon tilting (the angle in the ON state in particular) is required to be highly accurate, whereas the error in angle of incidence is doubled upon amplification before being emitted in the case of DMD 41. Therefore, it is a great advantage in the making of the apparatus that the angle of incidence to the DMD 4d can be adjusted highly accurately by freely regulating the light beam emission angle by the color reflector 3d.

The illumination apparatus and projection type display apparatus in accordance with the present invention are not limited to those of the above-mentioned embodiments, but can be modified in various manners. For example, while one liquid crystal display plate is provided in the above-mentioned embodiments, two liquid crystal display plates may be disposed so as to face two surfaces of the polarizing beam splitter, thus being used for P-polarized light and S-polarized light, respectively. In this case, the above-mentioned comb-shaped polarizing beam splitter is unnecessary.

Though the liquid crystal display plate is of a reflection type, a transmission type liquid crystal display plate may be used as a matter of course.

The light beam emission angles at the time when the DMD is ON/OFF are not limited to those in the above-mentioned embodiments.

Various modes can be considered for the arrangement of a color light reflecting surface to be formed on the color reflector. For example, individual color light reflecting surfaces may be formed successively at intervals of a small center angle. In some instances, the respective center angle regions of color light reflecting surfaces may be made different from each other. For example, the center angle region (including that summing a plurality of regions; ditto in the following) of the reflecting surface of the green light component having a higher luminous efficiency can be made solely larger than that of the reflecting surface of the other color light components.

The reflecting surface can be formed not only from a dichroic filter, but also from a diffraction grating, a hologram, and the like.

In the illumination apparatus in accordance with the present invention and the projection type display apparatus using the same, luminous fluxes from a light source section are reflected in a wavelength selecting manner by a rotary reflecting section as it rotates, whereby the apparatus can be made compact without raising its cost.

Since the rotary reflecting section is disposed between the light source section and the integrator section, the optical path can be bent between the light source section and the integrator section, whereby the freedom of design can be enhanced in order to make the apparatus compact.

Though the illumination area rotates when the optical path is spatially bent by a mirror member in general, the optical path can spatially be bent in front of the integrator section alone in the apparatus of the present invention, whereby the above-mentioned rotation forms no problem after all.

What is claimed is:

1. An illumination apparatus comprising:
    a light source section constituted by an illuminant and a light converging portion for converging a luminous flux from said illuminant;
    a color reflector comprising a rotary reflecting member disposed at a position where said luminous flux from said light source section is converged, said rotary reflecting member reflecting only a specific wavelength component in said luminous flux according to an angle of rotation from a reference position; and
    light quantity homogenizing means for homogenizing a light quantity of said luminous flux reflected by said color reflector.

2. An illumination apparatus according to claim 1, wherein said color reflector comprises n areas separately formed in a circumferential direction, each area being formed with a reflecting surface for reflecting only a predetermined specific wavelength component in said luminous flux, said luminous flux from said light source section successively irradiating said reflecting surfaces.

3. An illumination apparatus according to claim 2, wherein said reflecting surfaces are formed in the respective areas on said color reflector such that center angle regions of said reflecting surfaces reflecting only said predetermined specific wavelength component have substantially the same size.

4. An illumination apparatus according to claim 2, wherein said n is 3, said reflecting surfaces comprising a red light reflecting surface, a green light reflecting surface, and a blue light reflecting surface.

5. An illumination apparatus according to claim 4, wherein, on said color reflector, said green light reflecting surface is formed with a center angle region greater than that of each of the other reflecting surfaces.

6. An illumination apparatus according to claim 1, wherein said light quantity homogenizing means is constituted by a pair of flyeye lens members.

7. An illumination apparatus according to claim 2, wherein an axis of rotation of said color reflector and a normal on each reflecting surface are substantially parallel to each other.

8. An illumination apparatus according to claim 2, wherein an axis of rotation of said color reflector and a normal on each reflecting surface are substantially perpendicular to each other.

9. An illumination apparatus according to claim 8, wherein said color reflector has a polygonal cross section perpendicular to an axis of rotation, whereas said reflecting surfaces are successively formed at a side face portion.

10. An illumination apparatus according to claim 9, wherein said polygonal cross section is a regular polygon.

11. An illumination apparatus according to claim 2, wherein said reflecting surface is formed from a dichroic film.

12. An illumination apparatus according to claim 2, wherein said reflecting surface is formed from a diffraction grating or hologram.

13. A projection type display apparatus comprising:
    the illumination apparatus according to claim 1;
    a light valve for modulating output light from said light quantity homogenizing means according to a predetermined image signal; and
    a projection lens for projecting an optical image formed by said light modulated by said light valve onto a screen.

14. A projection type display apparatus according to claim 13, wherein only one said light valve is provided.

* * * * *